Fig. 8

United States Patent Office 3,291,263
Patented Dec. 13, 1966

3,291,263
SERVO ACTUATED DISC-BRAKES
Pierre André Georges Lepelletier, Chatou, France, assignor to Societe Anonyme Francaise du Ferodo, a corporation of France
Filed Nov. 18, 1964, Ser. No. 412,137
Claims priority, application France, Dec. 19, 1963, 957,773
9 Claims. (Cl. 188—152)

In French Patent No. 1,325,672, issued on March 2, 1962 to the Société Anonyme Francaise du Ferodo for "Improvements in brakes, especially for automobile vehicles" arrangements have been described relating to disc-brakes, according to which the brake supports have a possibility of movement in response to the braking reaction, and co-operate with chambers which transmit to the supply of the brake cylinders the small moments imparted to these supports by the braking reactions.

The present invention has for its object a disc-brake which comprises all or part of such arrangements or equivalent means, and the construction of which is compact, robust and adapted to an application to automobile vehicles, the mounting of the movable support of this brake being rotatable about the shaft of the wheel journal.

More particularly, a disc-brake according to the invention comprises a disc rotatably mounted about a stub axle or the like, a pair of shoes intended to grip the disc and associated with a rotatably mounted plate coaxial with the disc, about the said stub axle, so that the said plate tends to rotate when the shoes grip the disc, at least one clamping cylinder carried by the rotatable plate and supplied with fluid so as to cause the gripping of the disc between the shoes, a balancing device interposed between the stub axle and the rotatable plate and comprising a cylinder and piston means which form two chambers subject to variations in volume in opposite senses when the plate is permitted to rotate with respect to the stub axle, one of these chambers, known as the primary chamber, being coupled to the said braking cylinder while the other chamber, or secondary chamber, forms a cushion receiving the braking reaction.

The present invention has also for its object a braking installation for two wheels of an axle of an automobile vehicle having disc brakes as defined above, in which a master cylinder actuated by the driver, expels equal or proportional volumes of fluid into the brake cylinders of the two brakes, while the secondary chambers of the two brakes are connected to each other.

In accordance with a further characteristic feature of the invention, the brake cylinder and the balancing device occupy diametrically opposite positions on the rotatable plate.

The rotating plate is preferably rotatably mounted on a cylindrical bearing surface of the stub axle which is axially adjacent, both to the gripping zone of the disc and to the mean line of action of the balancing device. The cylindrical bearing surface of the stub axle around which the plate is rotatably mounted is axially located with advantage between the gripping zone of the disc and the mean line of action of the balancing device.

The objects, characteristic features and advantages of the invention will be further brought out in the description which follows below of forms of construction chosen by way of example, reference being made to the accompanying drawings, in which.

Figure 1:
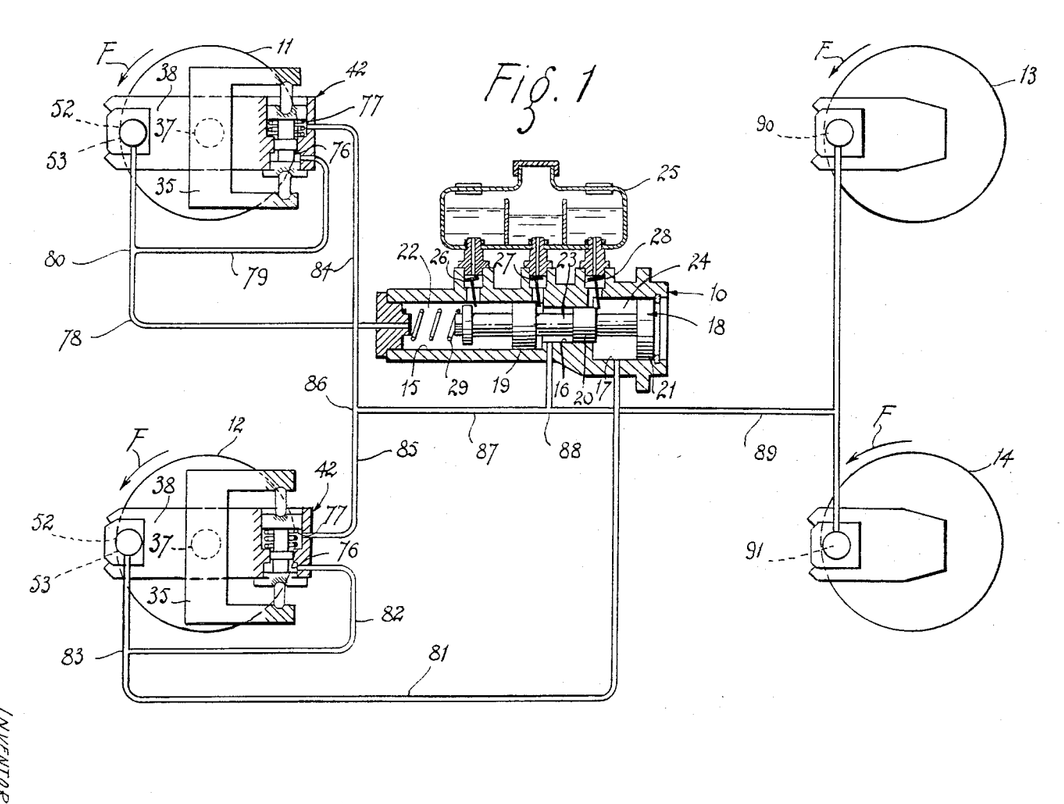
FIG. 1 is a diagram of a braking circuit comprising disc brakes in accordance with the invention.
Figure 2:
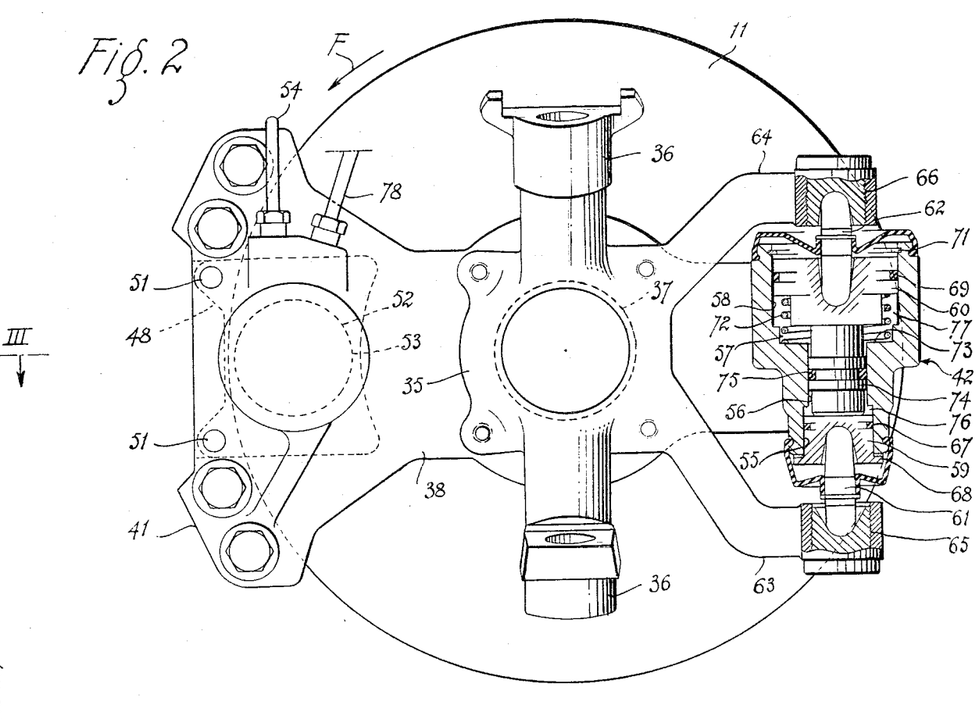
FIG. 2 is a view in elevation with parts broken away of a disc brake according to the invention.
Figure 3:
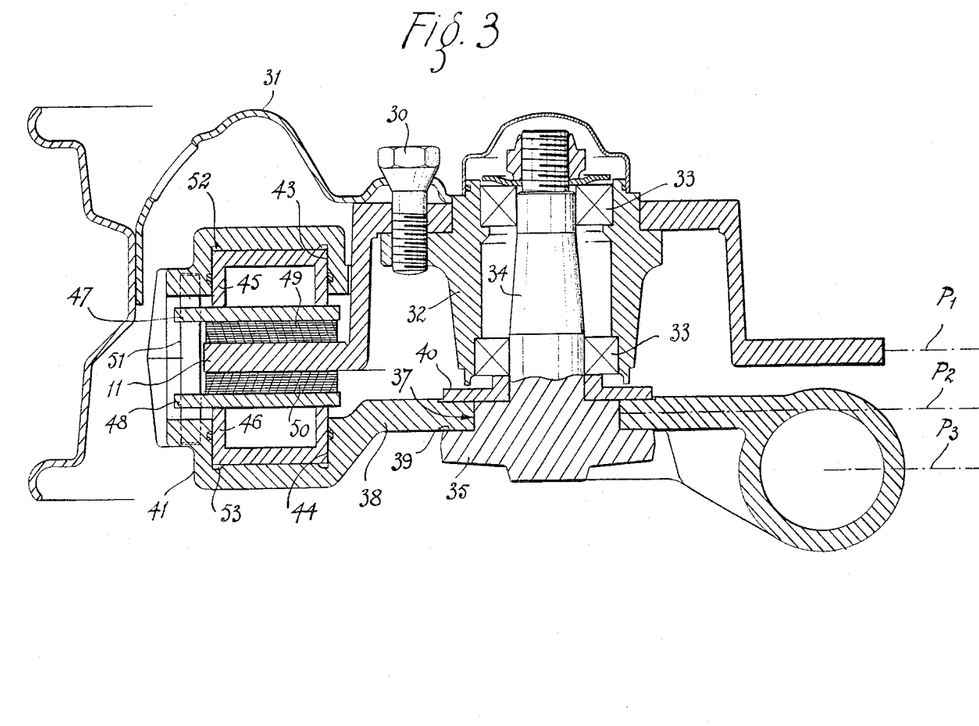
FIG. 3 is a view of this brake in cross-section, taken along the line III—III of FIG. 2.

In the form of construction shown in FIGS. 1 to 3, there can be seen in FIG. 1 at 10 the master-cylinder of the brake, at 11 and 12 the discs of the disc-brakes of the two front wheels, and at 13 and 14 the discs of the disc-brakes of the two rear wheels.

The master-cylinder 10 is provided with three cylindrical bores in line: a forward bore 15, an intermediate bore 16 and a rear bore 17. The fluid of the installation is substantially non-compressible, such as oil.

In the bores 15, 16 and 17 is mounted a sliding unit 18 actuated by the brake pedal (not shown). The unit 18 comprises a piston 19 working in the bore 15, a piston 20 working in the bore 16 and a piston 21 working in the bore 17. In front of the forward piston 19 is formed a chamber 22 known as the primary chamber. Between the pistons 19 and 20 is formed a chamber 23 known as the secondary chamber. Between the pistons 20 and 21 is defined a further primary chamber 24. The chambers 22, 23 and 24 are connected to a tank 25 respectively through tiltable valves 26, 27 and 28, rocked by the unit 18. A spring 29 keeps the unit 18 in a position of rest at which the valves 26, 27 and 28 are partly open.

The master cylinder 10 is arranged in such manner that when the unit 18 is depressed under the action of the pedal, first of all the valves 26, 27 and 28 are permitted to close, and then proportional volumes, for example equal to each other, are independently expelled by the primary chambers 22 and 24.

The discs 11 and 12 of the front wheels (FIGS. 2 and 3) are each fixed by screws 30 to the wheel disc 31 and to a hub 32 which is rotatably mounted by means of bearings 33 on the stub axle 34 of the wheel. The stub axle 34 forms part of a member which comprises a boss 35 with two arms 36, by which this member is positioned.

The boss 35 is provided with a cylindrical bearing surface 37 which is coaxial with the stub axle 34, and about which a plate 38 is rotatably mounted. The plate 38 is located axially between a shoulder 39 of the boss 35 and a ring 40 engaged round the stub axle 34.

At two diametrically opposite extremities, the plate 38 carries respectively a clamping stirrup 41 for the disc 11 and a cylinder 42 for balancing the braking reactions.

The stirrup 41 is provided with two opposite cylinders 43 and 44, in which are slidably engaged two pistons 45 and 46 for the operation of two brake-shoes 47 and 48 provided with friction linings 49 and 50, intended to co-operate with the two opposite faces of the disc 11. The shoes 47 and 48 are guided in their displacement along small pillars 51.

It will be observed from FIG. 3 that the three planes $P_1$, $P_2$, $P_3$, perpendicular to the aixis, in which are arranged the zone of the disc 11 engaged by the friction linings 49 and 50, the cylindrical bearing surface 37 about which the plate 38 is rotatably mounted, and the axis of the cylinder 42 are adjacent to each other. The pivotal plane $P_2$ is located between the two other planes $P_3$ and $P_1$ which are planes of force. In the case of FIG. 3, $P_2$ is substantially half-way between $P_1$ and $P_3$. The result of this arrangement is a balanced configuration of the various parts of the brake.

The piston 45 (see FIG. 3) forms in the cylinder 43 a hydraulic chamber 52, while the piston 46 forms a further hydraulic chamber 53 in the cylinder 44. The two chambers 52 and 53 are connected together by means of a conduit 54 (FIG. 2).

As shown in FIG. 2, the balancing cylinder 42 is provided with a bore having a number of portions of different diameters, 55, 56, 57 and 58. In the end portion 55 is engaged a piston 59, or so-called primary piston, while in the other end portion 58, the diameter of which is larger than that of the portion 55, is engaged a piston 60 known as the secondary piston.

The pistons 59 and 60 are provided externally with crutches 61 and 62 which are supported on the arms 63 and 64 of a fork-shaped portion of the boss 35. These supports on the arms are adjustable by means of threads 65 and 66.

The primary piston 59, the sealing joint of which is shown at 67 has its travel into the bore 55 limited by a small collar 68 coming into abutment against the cylinder 42. The secondary piston 60 has a sealing joint 69. A keeper-ring 71 is provided to retain the piston 60 during assembly, that is to say before adjustment by the threaded portions 65 and 66. A spring 72 supported on the shoulder 73 which separates the bores 56 and 57, tends to apply the cylinder 42 in abutment against the collar 68 of the primary piston 59, which is in turn in abutment against the crutch 61, so as to bring the whole into a well-defined position of rest, in which an appropriate reserve of oil is kept in the chamber 77. The secondary piston 60 is provided with a tail which forms a piston 74 engaged in the bore 56. The latter has a diameter slightly less than that of the bore 55. The tail forming the piston 74 has a sealing joint 75 and is adapted to be applied in abutment against the piston 59.

A chamber 76 is defined in the bores 55 and 56 between the joints 67 and 75 of the pistons 59 and 74, while a chamber 77 is formed in the bores 56, 57 and 58, between the said joint 75 and the joint 69 of the piston 60.

The adjustment at 65 and 66 is effected in such manner that the abutment between the tail 74 and the piston 59 is continuous and free from play, but without excessive pressure. The stacking of the various parts 61, 59, 74–60, 62 is thus suitably held between the arms 63 and 64.

In the position of rest, the spring 72 which fixes the position of the cylinder 42 with respect to the arms 63 and 64 of the fixed member 35, as explained above, gives the plate 38 an angular position which is precisely defined with respect to the cylindrical bearing surface 37 about which this plate 38 can rotate.

In FIG. 2, the arrow F shows the direction of rotation of the disc 11 when the vehicle is moving in a forward direction. It will be observed from FIG. 2 that the plate 38 can move from the above-mentioned position of rest in the direction of the arrow F, which has the effect of causing the cylinder 42 to move upwards with respect to the stack 61, 59, 74–60, 62. During the course of this movement, the volume of the chamber 76 increases while the volume of the chamber 77 diminishes. Such a movement is normally limited by the presence of oil in the chamber 77 and is modulated by the effects of the pressures in the chambers 76 and 77 as will be described later. It is in any case limited mechanically by the coming into abutment of the shoulder 73 against the piston 60.

Starting from the above-mentioned position of rest, the plate 38 is prevented from moving in the opposite direction to the arrow F because the cylinder 42 is in abutment on the small collar 68 of the piston 59.

The chambers 52 and 53 of the disc-brake 11 are coupled as shown in FIG. 1 to a conduit 78 which is connected to the primary chamber 22 of the master cylinder 10, while a conduit 79, connected at 80 to the conduit 78, is coupled to the chamber 76 of the cylinder 42 of the disc-brake 11.

The chambers 52 and 53 of the disc-brake 12 are connected to a conduit 81 which is coupled to the other primary chamber 24 of the master cylinder 10, while a conduit 82, connected at 83 to the conduit 81, is coupled to the chamber 76 of the cylinder 42 of this disc-brake 12.

The chamber 77 of the cylinder 42 of the disc-brake 11 and the chamber 77 of the cylinder 42 of the disc-brake 12 are respectively connected to two conduits 84 and 85 which are coupled at 86 to the same conduit 87, coupled to the secondary chamber 23 of the master-cylinder 10.

On the conduit 87 is connected at 88 a conduit 89 which supplies cylinders 90 and 91 of disc-brakes 13 and 14, of normal construction.

At rest, the unit 18 of the master cylinder 10, pushed back by the spring 29, occupies the position shown in FIG. 1. The primary circuit 78, 79, 22 is connected to the tank 25 by the half-open valve 26. The other primary circuit 81, 82, 24 is connected to the tank 25 through the half-open valve 28. And the secondary circuit 84, 85, 87, 80, 23 is also put to the tank 25 through the half-open valve 27. The four brakes are released. The orientatable plates 38 of the front brakes 11 and 12 are held in their position of rest by the springs 72, as has been previously indicated.

For the purpose of a braking operation on forward running (arrows F in FIGS. 1 and 2), when pressure is applied on the brake pedal, the unit 18 is displaced towards the left of FIG. 1, which frees the valves 26, 27 and 28 so that these valves close. Starting from that moment, the chambers 22 and 24 deliver respectively through the primary conduits 78 and 81 into the chambers 52, 53 and 76 of the front brakes 11 and 12.

This first part of the operation enables a rapid approach of the linings 49 and 50 of the shoes 47 and 48 to be made against the discs 11 and 12 of the front brakes.

The contact of the linings 49 and 50 of the shoes 47 and 48 against each disc 11 and 12 has the effect of tending to drive the plate 38 in rotation about the cylindrical bearing surface 37 in the direction of the arrow F of FIGS. 1 and 2.

This results in a detachment of the cylinder 42 from the collar 68, which has the effect of putting the chamber 77 under high pressure. This high pressure is the same in the chambers 77 of the two front brakes 11 and 12, by reason of the communication 86, and it is applied through the conduit 89 to the rear brakes 13 and 14 which, for their part, are thus permitted to engage in an effective manner. A further result of such an increase in the secondary pressure is to assist the depression of the brake pedal, since, in the case of FIG. 1, the bore 16 has a smaller diameter than that of the bore 15.

The rotatable mounting of the plate 38 at 37 and the arrangements which have just been described permit of obtaining an excellent balancing of the braking between the front brakes 11 and 12, irrespective of the conditions of working, identical or different, of the two wheels.

In the case where the working conditions are the same on the two front wheels, for example if it is found at the moment of braking that the coefficient of friction of the linings 49 and 50 is exactly the same for the two wheels and that the coefficient of adhesion on the ground is such that none of the wheels becomes locked, the forces are symmetrical in pairs between the right-hand brake and the left-hand brake and the two primary pressures at 52, 53 and 76 are equal. The orientatable plates 38 of the two brakes then find themselves occupying precisely symmetrical positions.

In general, the coefficients of friction are not exactly the same for the two brakes and may differ slightly between one brake and the other while being furthermore variable in more or less considerable proportions.

For example, if at the moment of braking, the coefficient of friction of the linings 49 and 50 is higher on the right-hand side than on the left, the plate 38 of the right-hand brake has a tendency to carry out a small additional rotation in the direction F and, through the intermediary of the secondary chamber 77–84–86–85–77, to force the cylinder 42 of the left-hand brake to carry out a small corresponding movement in the opposite direction to that of the arrow F.

The capacity available for the oil of the right-hand primary circuit 78, 79 thus increases by a small amount, while the capacity available for the oil of the left-hand primary circuit 81, 82 is reduced by the same small amount.

As the volumes of oil enclosed in the two primary circuits are invariable since the master cylinder 10 has driven into them proportional volumes, for example equal volumes, and since on the other hand all communication between these circuits is prevented, these small variations of capacity produce inverse variations of pressure. The primary pressure on the right-hand side thus becomes lower than the primary pressure on the left-hand side, which compensates for the differences in the coefficients of friction.

By virtue of this arrangement, an excellent balancing of braking is obtained. In addition, as oil is an incompressible fluid, very large variations of pressure are produced by very small variations of capacity. This permits the rotating plate 38 of each of the two brakes to occupy a very stable position of equilibrium which is always very close to the position of exact symmetry, irrespective of the values of the two primary pressures and the secondary pressure.

It may happen that the coefficients of adhesion of the wheels on the ground are not the same for both wheels and that one of the wheels may become locked. For example, if at the moment of braking the coefficient of adhesion wheel-ground is less on the left-hand side than on the right and if the left-hand wheel becomes locked, the plate 38 of the left-hand brake has a tendency to carry out a small backward movement in the opposite direction to the arrow F and, through the intermediary of the secondary chamber 77–84–86–85–77, to permit the cylinder 42 of the right-hand brake to carry out a small additional rotation in the direction of the arrow F.

The capacity available for the oil of the right-hand primary circuit 78, 79 thus increases by a small quantity, while the capacity available for the oil of the left-hand primary circuit 81, 82 is reduced by this same small quantity. The primary pressure on the right-hand side, for the same reasons as those previously given, becomes smaller than the primary pressure on the left-hand side. The braking is thus reduced on the unlocked right-hand wheel, which is favourable to conditions of safety.

The construction and in particular the choice of the various primary and secondary working sections in the brakes and in the master cylinder can be established in such manner that this reduction in braking is sufficient to prevent any skidding of the vehicle, while at the same time leaving a braking effect in operation which enables the best advantage to be taken of the higher coefficient of adhesion of the right-hand side.

If the two wheels become locked at the same time, the balancing effect would persist under identical conditions.

During forward running, if the secondary circuit 84–85–87–89 became broken, there would be no braking on the rear wheels, but the braking would remain effective on the front brakes, the plates 38 of which would occupy a position in which the shoulders 73 of the cylinders 42 abut against the pistons 60. In the event of one of the primary circuits 78 or 81 becoming broken, braking would still subsist on a single front brake and on the rear brakes with a resulting unbalance at the front and a lower overall effectiveness.

When running in reverse, the braking reactions have a tendency to apply the cylinders 42 in abutment against the small collar 68 of the pistons 59. The braking is mainly effected by the front brakes.

Figure 4:
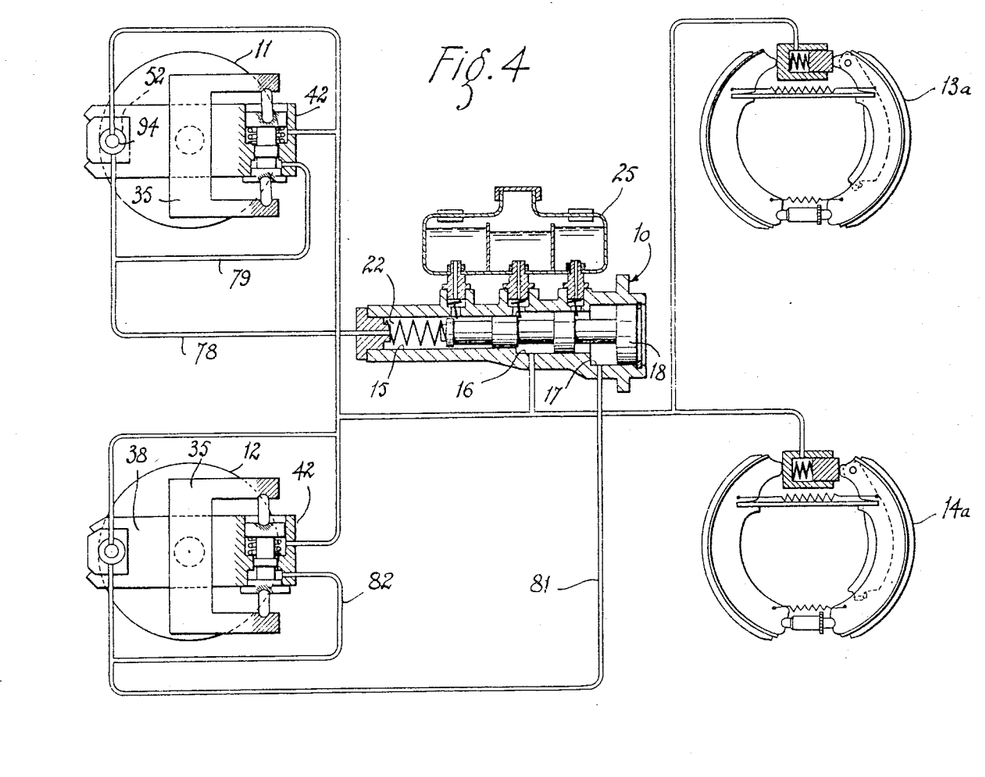
FIG. 4 is a diagram similar to that of FIG. 1, but relating to an alternative form of braking circuit.

Reference will now be made to FIG. 4, in which the arrangement is similar to that of FIG. 1, but in which the rear brakes are drum brakes indicated by 13a and 14a instead of being the disc brakes 13 and 14.

In addition, the bore 16 is of larger diameter than the bore 15, instead of being smaller in diameter as in FIG. 1. This arrangement results in an increased force at the pedal, but enables an excessive self-gripping effect to be avoided, when, as has been shown by way of example in FIG. 4, the secondary pressure is permitted to act directly at 94 for gripping the disc.

Figure 5:
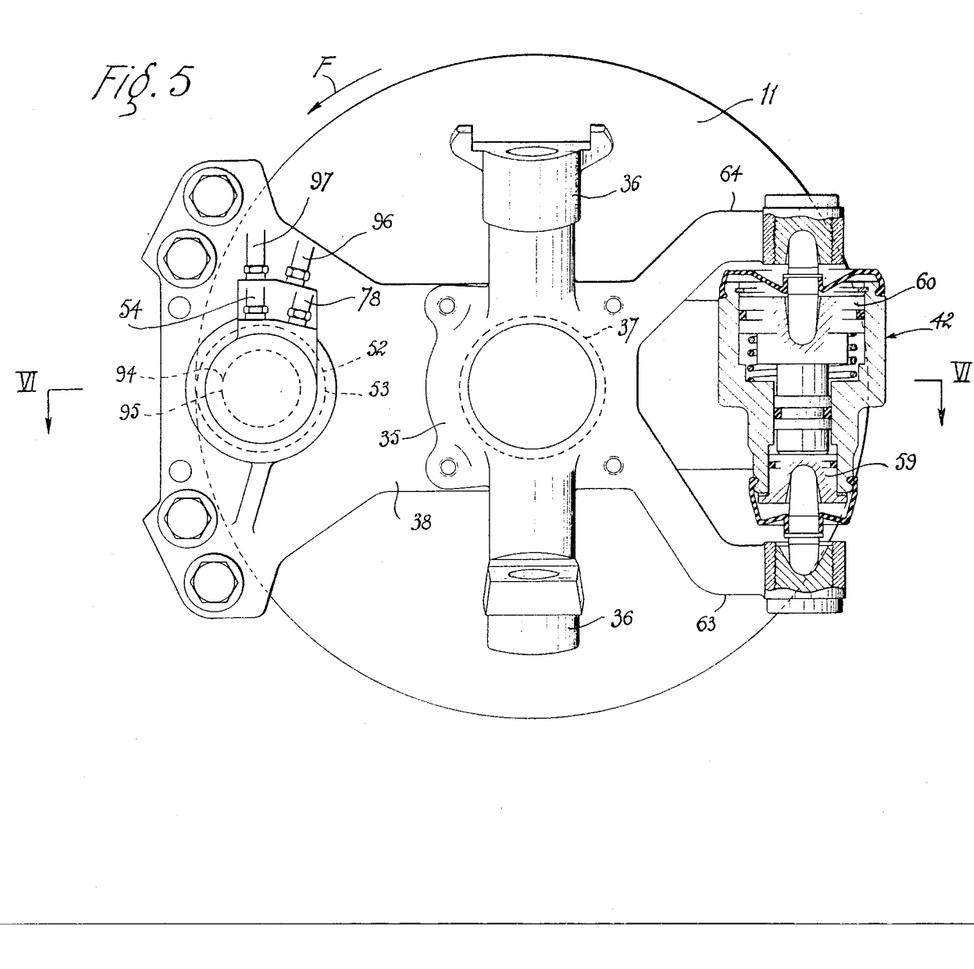
FIG. 5 is a view in elevation with parts broken away, of an alternative form of disc-brake.
Figure 6:
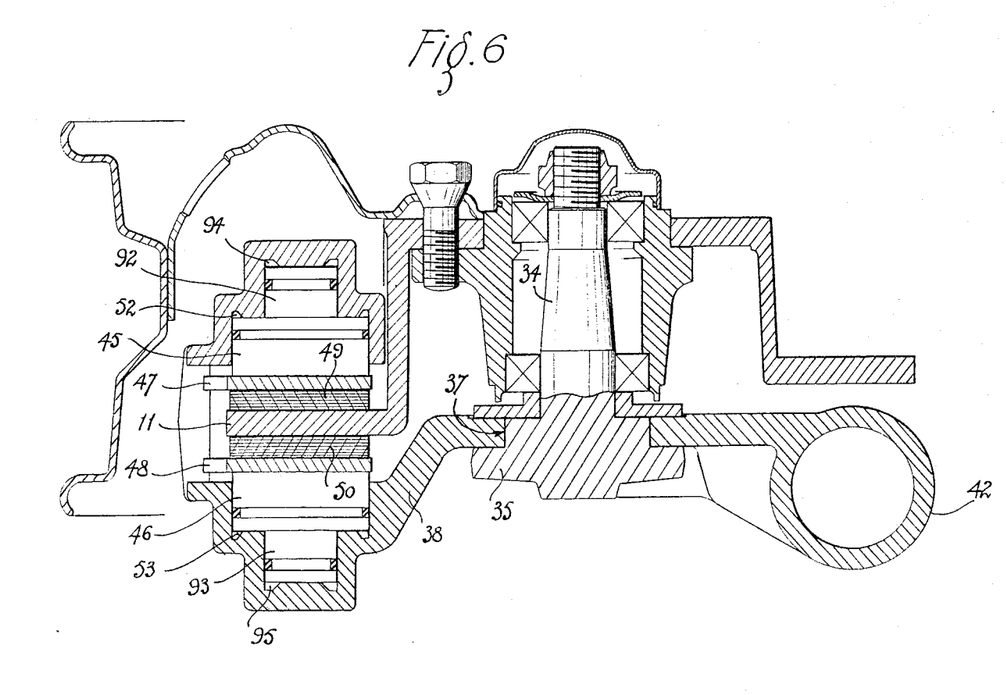
FIG. 6 is a view of this alternative form of brake in cross-section taken along the line VI—VI of FIG. 5.

Reference will now be made to FIGS. 5 and 6, in which an arrangement of this kind, in which the pressure of the secondary circuit is permitted to act directly on the gripping of the disc 11, 12 is shown in detail. In the example of FIGS. 5 and 6, each of the pistons 45 and 46 subjected to the primary pressure in the chambers 52 and 53 is extended (see FIG. 6) by a tail 92, 93 forming a piston subjected to the secondary pressure in chambers 94, 95 which constitute supplementary cylinders. There will be recognized in FIG. 5 at 78 the primary conduit, connected to one of the chambers 52 and 53, and at 54 the conduit which inter-connects the chambers 52 and 53, and there is seen at 96 a conduit which is connected to the secondary circuit 84–85–87–89, and which is coupled to one of the chambers 94 and 95 and, at 97, a conduit which inter-connects the chambers 94 and 95.

The operation is substantially the same as that which has been described above with reference to FIGS. 1 to 3, but in this case the gripping of the discs 11 and 12 is made more powerful by the contribution of the secondary pressure in the chambers 94 and 95. In addition, any substantial unbalance between the braking effect of the two front wheels is avoided in the event of one of the primary circuits 78 or 81 becoming broken.

There will preferably be adopted a master cylinder 10 of the kind shown in FIG. 4, in which the action on the pedal must overcome the development of the secondary pressure. Any excessive self-gripping effect is avoided, which derives from the direct action of the secondary pressure for the purpose of gripping the discs 11 and 12.

The contribution of the secondary pressure to the direct gripping force on the disc 11, 12 may be attained, not only in the manner shown in FIGS. 5 and 6, but also in any other appropriate way. For example, the secondary pistons 93, instead of acting in series with the primary pistons 45 and 46 on the shoes 47 and 48, could act in parallel with these pistons on the said shoes. Instead of a single primary piston of large diameter for a secondary piston of smaller diameter, primary and secondary pistons could be provided in any number, with any diameters following an appropriate choice. The secondary pistons could furthermore act on supplementary shoes which are separate from the shoes 47, 48 on which the primary pistons act. These supplementary shoes could with advantage be provided in the vicinity of the balancing cylinder 42 by reason of the proximity of the chamber 77 in which the secondary pressure is developed.

Figure 7:
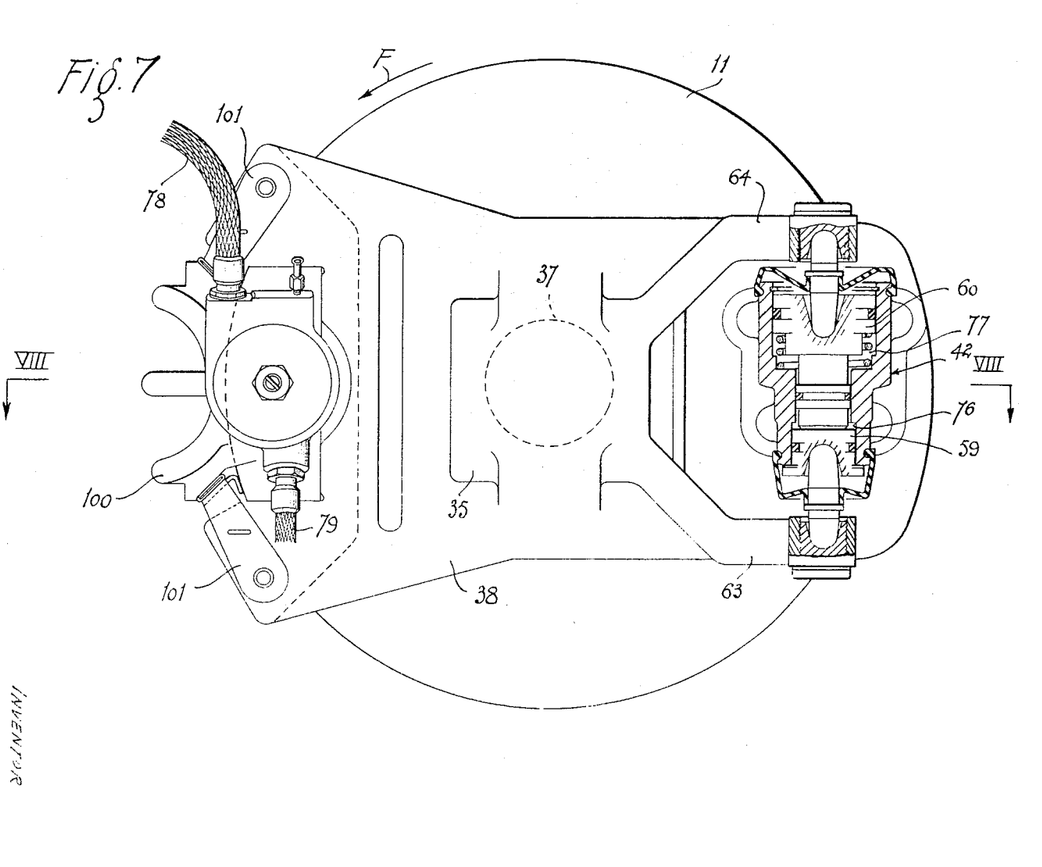
FIG. 7 is a view in elevation with parts broken away, of a further alternative form of disc-brake.
Figure 8:
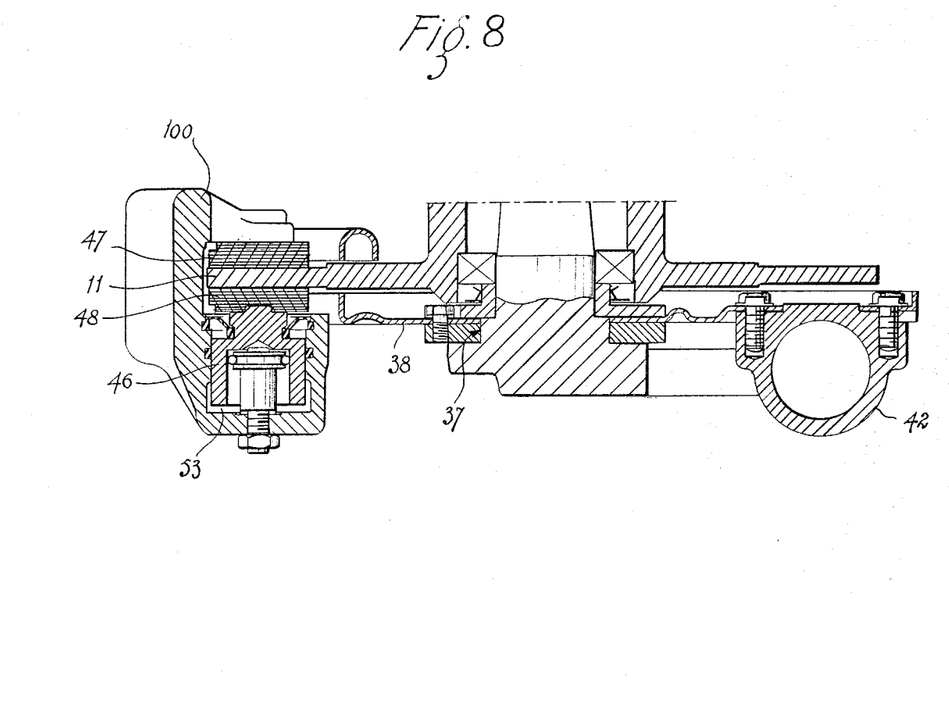
FIG. 8 is a view of this other alternative in cross-section taken along the line VIII—VIII of FIG. 7.

Reference will now be made to FIGS. 7 and 8, which relate to an application of the invention to a disc-brake of the floating stirrup type. As previously, the plate 38 is rotatably mounted at 37 and carries both the balancing cylinder 42 and the gripping device using the shoes 47, 48, but in this case the latter co-operate with a stirrup 100 mounted floating, with lugs 101, with respect to the plate 38. The shoe 37 is directly supported on the stirrup 100, the piston 45 being eliminated, while the shoe 48 is associated with the piston 46, which is slidably mounted in the stirrup 100. There can be seen in FIG. 7 at 78 the supply conduit for the chamber 53 of the piston 46, and at 79 the conduit connecting the chamber 53 with the chamber 76 of the cylinder 42.

The operation of the brake shown in FIGS. 7 and 8 is similar to that which has been previously described.

Figure 9:
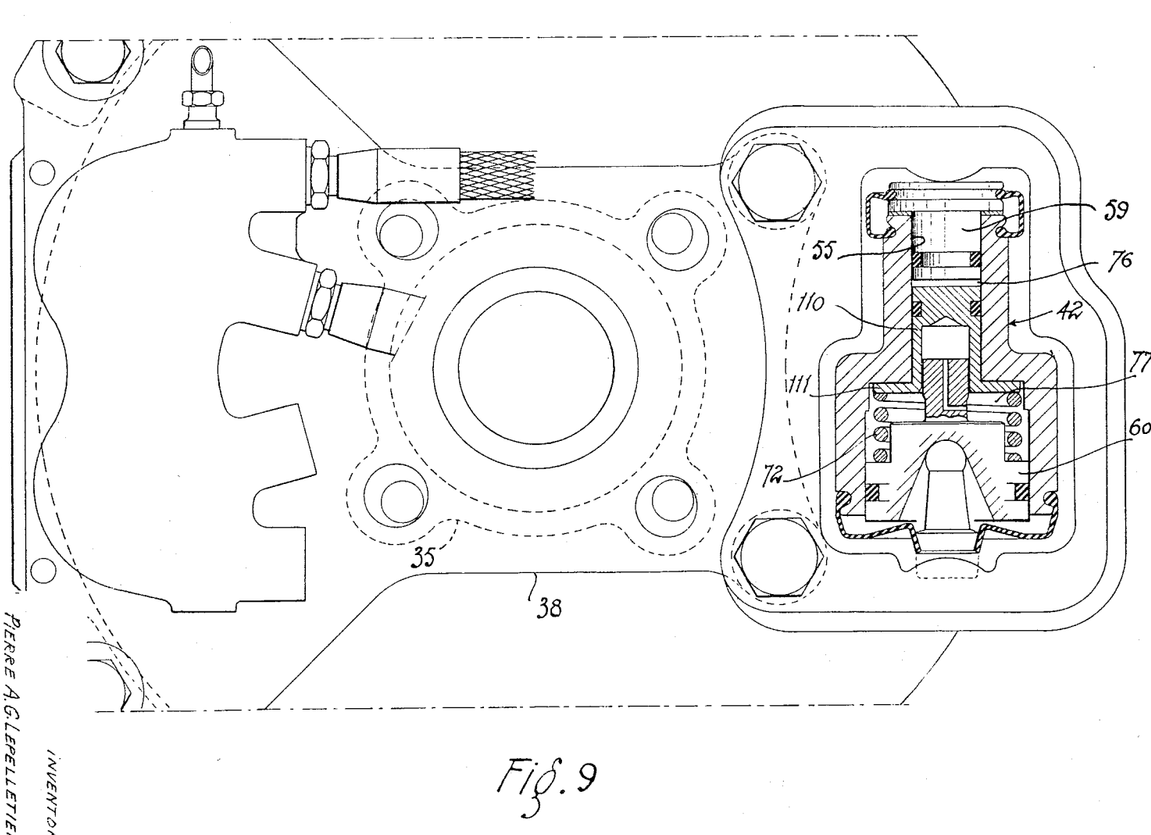
FIG. 9 relates to still a further alternative construction.

In another alternative form shown in FIG. 9, it is the cylinder 42 which is carried by the fixed body 35, while the pistons 59 and 60 are coupled to the orientatable plate 38. There will be recognized in FIG. 9 at 76 the primary chamber and at 77 the secondary chamber of the cylinder 42. The operation is similar to that of the cylinder 42 of FIG. 2.

The arrangement of FIG. 9 further comprises an alternative form of construction, which consists in eliminating the tail 74 of the piston 60 and in replacing it by an independent intermediate piston 110 sliding in the bore 55 of the piston 59, or, if this is preferred, in a bore 56 which would have in this case the same diameter as the bore 55. The piston 110 is provided with a small collar 111 in the chamber 77, and it is against this collar 111 that the spring 72 is supported.

During forward running, under the effect of the high secondary pressure, the ring 111 remains locked on the cylinder 42, and the movements of the pistons 59 and 60 give inverse variations of volume.

When running in reverse, or each time the secondary pressure becomes less than the primary pressure, the ring 111 can be allowed to move back against the action of the spring 72, until it abuts against the piston 60, thus increasing the volume of oil displaced by the chamber 23 in the secondary circuit for the purpose of direct gripping of the four brakes.

When changing over from forward running to reverse, the three pistons 59, 110 and 60 are moved as a unit, without variation of volume, that is to say without risk of shocks.

It will be understood that the construction shown in FIG. 9 is applicable to FIG. 2 and, vice-versa, FIG. 9 may comprise the construction of FIG. 2.

It will furthermore also be understood that the invention is not limited to the forms of embodiment described and shown above, but includes all its alternative forms.

What I claim is:
1. A disc-brake comprising a disc, a stub axle or the like on which the disc is mounted for rotation, a plate rotatably mounted on the brake for rotation about the axis of the disc, a pair of brake shoes carried by the plate for gripping the disc, so that the plate tends to rotate about said axis when the shoes grip the disc, at least one gripping cylinder carried by the plate, means for supplying fluid under pressure to said cylinder to grip the disc between the shoes, and a balancing device interposed between said stub axle and said plate and acting on said plate to urge said plate to rotate about said axis under braking conditions and comprising cylinder and piston means spaced from said axis and forming a primary chamber and a secondary chamber that vary in volume in opposite senses when the plate rotates relative to the axle, said primary chamber communicating with said gripping cylinder to vary the pressure in said gripping cylinder upon rotation of said plate and said secondary chamber providing a cushion receiving the braking reaction.

2. A brake as claimed in claim 1, said gripping cylinder and said balancing device being disposed on opposite sides of said axis.

3. A brake as claimed in claim 1, said stub axle having a cylindrical bearing surface on which said plate is rotatably mounted and which is in alignment with said shoes and said balancing device.

4. A brake as claimed in claim 3, said cylindrical surface being disposed between said shoes and said balancing device.

5. A brake as claimed in claim 1, said piston means comprising a secondary piston, an intermediate piston and a primary piston, said intermediate piston and said primary piston defining between them said primary chamber, and said intermediate piston and said secondary piston defining between them said secondary chamber.

6. A brake as claimed in claim 5, and a spring disposed and acting between the secondary piston and the cylinder.

7. A brake as claimed in claim 6, said secondary piston having a tail which is continuously in abutment against the primary piston, one end of said spring acting against a shoulder formed in said cylinder.

8. A brake as claimed in claim 6, said intermediate piston having a small collar against which said spring acts, said cylinder having a shoulder that contacts said collar.

9. A braking installation for two wheels of an automotive vehicle, comprising a pair of disc brakes one for each wheel, each disc brake comprising a disc, a stub axle or the like on which the disc is mounted for rotation, a plate rotatably mounted on the brake for rotation about the axis of the disc, the plates of the two brakes being rotatable independently of each other, a pair of brake shoes carried by each plate for gripping the disc, so that the plate tends to rotate about said axis when the shoes grip the disc, at least one gripping cylinder carried by the plate, means for supplying fluid under pressure to the cylinder of each brake independently of the cylinder of the other brake to grip the disc between the shoes, and a balancing device interposed between said stub axle and said plate and acting on said plate to urge said plate to rotate about said axis under braking conditions and comprising cylinder and piston means spaced from said axis and forming a primary chamber and a secondary chamber that vary in volume in opposite senses when the plate rotates relative to the axle, the primary chamber communicating with said gripping cylinder to vary the pressure in said gripping cylinder upon rotation of said plate, the secondary chamber of one brake communicating with the secondary chamber of the other brake.

References Cited by the Examiner

UNITED STATES PATENTS

| | | | |
|---|---|---|---|
| 2,107,257 | 2/1938 | Beusch | 188—141 X |
| 3,137,370 | 6/1964 | Lepelletier | 188—152 |
| 3,173,517 | 3/1965 | Powlas | 188—152 |

FOREIGN PATENTS

| | | |
|---|---|---|
| 163,558 | 6/1955 | Australia. |
| 846,055 | 8/1960 | Great Britain. |

MILTON BUCHLER, *Primary Examiner.*

G. E. A. HALVOSA, *Assistant Examiner.*